2,951,829
HALOGENATED EPOXY RESINS

Max E. Chiddix and Robert W. Wynn, Easton, Pa., assignors to General Aniline & Film Corporation, New York, N.Y., a corporation of Delaware No Drawing. Filed Dec. 28, 1956, Ser. No. 631,015

4 Claims. (Cl. 260—78.4)

The invention here presented is a new synthetic resin prepared from bis-epoxides derived from 2,2,3,3-tetra-chloro-1,4-butanediol, characterized by a good resistance to heat, low flammability and the property of self-extinguishment upon the removal of heat.

A considerable number of moldable natural resins exist, and a relatively very large number of moldable synthetic resins have been produced but no single resin heretofore known or produced has all of the properties which are desirable in a moldable resin, some being unduly costly, others being thermoplastic but not thermo-setting, still others having undesirable solubility in various solvents, most of them being undesirably combustible and many other analogous deficiencies.

According to the present invention it is now found that the bis-chlorohydrin ethers of the above mentioned application, which may conveniently be called "bis-epoxides", will condense with such substances as the diamines, or the polycarboxylic acids or the anhydrides to yield resins which are relatively high in chlorine content and as a consequence thereof show an outstandingly improved resistance to combustion, as well as good heat resistance, high strength, high dielectric constants, high insolubility in most solvents. Furthermore no condensation catalysts are required; it being merely necessary to mix the bis-epoxide wtih the desired cocondensate and heat the mixture, whereupon a clear, hard, slightly amber resin is produced.

These resins are highly desirable for a wide range of molding, casting and coating uses. The resin is particularly advantageous for the manufacture of electrical insulating structures in view of its excellent breakdown resistance, excellent dielectric constant, high strength, the property of ready admixture with fillers and the like, and its high resistance to flame and the electric arc in particular. Similarly the components of the resin are very soluble in various convenient solvents such as benzene, toulene, xylene, carbon tetrachloride, acetone, methyl ethyl ketone, the proprietary solvents known as "Cellosolve," "Carbitol" and the like, in which solution they are excellent lacquers, varnishes and paint bases with either pigments or dyes as desired. Similarly they are excellent coating materials suitable for application to fabrics in general including woven, knitted and felted fabrics, glass fibers, paper, leather and the like. For such uses a solution of the respective components may be applied to the fabric, and the condensation completed by heating the fabric. Alternatively an initial partial condensation may be obtained and the resulting soft resin roll-coated on to the fabric, whereafter the condensation may be completed by an appropriate heat treatment. The resin tends to be relatively hard and relatively inelastic, however by the use of appropriate plasticizers a substantial amount of flexibility can be imparted to the resin. For this purpose such substances as the low molecular weight polyester and the low molecular weight epoxy resins are particularly suitable. Also the phthalic acid esters, the polyglycols and the high molecular weight diesters and the like may be used.

Thus the process of the invention yields a new product in the form of a very excellent synthetic, moldable, thermosetting resin. Other objects and details of the invention will be apparent from the following description.

The primary component of the invention is the bis-chlorohydrin ether or bis-epoxide having the following structural formula:

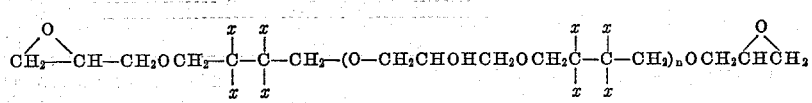

where $x=$Cl, Br, F, $n=0$ or an integer up to 20.

It may be noted that the process for the manufacture of the bis-epoxides yeilds a material of relatively high purity which for the manufacture of resins does not require further purification.

The primary compound is then condensed with a diamine or a polycarboxylic acid or an anhydride or mixtures thereof. Representative diamines which can be used in the invention are 1,2-diaminoethane, 1,4-diaminobutane, 1,3-diaminopropane, 1,2-diamino-2-methylpropane, 2,3-diamino-2-methylbutane, 2,4-diamino-2-methylpentane, 2,5-diamino-2,5-dimethylhexane, hexamethylenediamine, o-, m-, and p-phenylenediamine and their derivatives which are substituted in the nucleus, methylene dianiline, 2,4-diaminotoluene, 2,6-diaminotoluene, 3,3'-diaminodipropylamine, diethylene triamine, triethylene tetramine.

Dibasic acids, such as succinic acid, maleic acid, phthalic acid and its derivatives which are substituted in the nucleus, can be used as well as hydrogenated phthalic acids, as well as their anhydrides. Other acid anhydrides, which are produced by diene syntheses can also be used, for instance the acid anhydrides which are derived from terpinene or limonene or unsaturated hydrocarbons of the terpene series, and maleic acid-anhydride, also those of maleic acid-anhydride plus cyclopentadiene and substituted cyclopentadienes. Specific dibasic acids and anhydrides include 3,4,5,6-tetrachlorophthalic anhydride, 3,4,5,6-tetrachlorophthalic acid, 3,4,5,6-tetrabromophthalic anhydride, 2,3-dichlorosuccinic acid, 2,2,3,3-tetrabromosuccinic acid, hexachlorohexahydro endo methylene phthalic anhydride. Also useful are polymeric anhydrides such as polyvinylmethylether-maleic anhydride (U.S. 2,047,398) and polystyrene-maleic anhydride.

These substances are listed as representative cocondensates but the usable condensates are not limited to this list since substantially any difunctional or polyfunctional compound can be condensed in one way or another.

In preparing the condensation mixture it is usually preferable to have present equivalent amounts of the bisoxide and the cocondensate. This however is not essential but good results are obtained with from 60% to 120% of the equivalent amounts of the cocondensate present with the bis-epoxides.

It may be noted that an outstanding property of these resins is the very high resistance to attack by microorganisms such as bacteria, fungi and the like; probably due in part at least to the relatively high proportion of halogen present in the compound.

The following examples are offered as showing the best way, now known of practicing the invention but they are not intended to limit the scope of the claims solicited in any way whatever.

The primary component, the bis-epoxides may conveniently be prepared by the following procedure:

| Bis-Epoxide, Grams | Other Component Grams | Time, Hrs. | Temp., °C. | Description of Resin |
|---|---|---|---|---|
| 25 | Phthalic Anhydride, 5 | 4 | 150 | Soft, clear, amber. |
| 25 | Phtahlic Anhydride, 8 | 4 | 150 | Hard, clear, amber. |
| 25 | Phthalic Anhydride, 10 | 4 | 150 | Do. |
| 25 | Phthalic Anhydride, 5 | 4 | 150 | Soft, sticky, clear, amber. |
| 25 | Phthalic Anhydride, 10 | 4 | 150 | Hard, clear, amber. |
| 25 | Tetrachloro Phthalic Anhydride, 8 | 4 | 150 | Medium hard, clear, amber. |
| 35 | PVM/MA—sp.=1.1, 65 | 4 | 150 | Medium soft, cloudy in spots, amber. |
| 25 | m-Phenylene Diamine, 3 | 20 | 40–55 | Hard, clear, amber. |
| 25 | ___do___ | 20 | 40–55 | Cured at 100° C. for 3 hours. Very slight darkening. |
| 25 | Ethylene Diamine, 1.4 | 20 | 30 | Hard, clear, amber. |
| 25 | ___do___ | 20 | 30 | Cured at 100° C. for 3 hours. Very slight darkening. |

A mixture of—

45 g. (1.125 M) sodium hydroxide
750 cc. water and
750 cc. isopropyl alcohol was cooled to 10° C. and
342 g. (1.5 M) 2,2,3,3-tetrachloro-1,4-butanediol added.

After complete dissolution 417 g. (4.5 M) epichlorohydrin was added in 20 minutes. The temperature was allowed to rise to 25° C. in 3 hours and then held at 25° C. to 30° C. for 6 hours.

150 g. (3.75 M) sodium hydroxide was added in small portions so that the temperature did not rise above 42° C. without cooling. This addition took 5 hours. The mixture was then stirred at room temperature 2½ hours longer.

There was added 2000 cc benzene and 750 cc. water. The layers were separated and the benzene layer washed twice with water. The benzene was removed under aspirator vacuum and the residue heated for 1¾ hours to 118–121° C. under 0.05 mm. pressure.

*Example 1*

A mixture was prepared consisting of 25 g. of the above epoxide and
10 g. of phthalic anhydride was cured at 150° C. for 4 hours. A hard, clear, amber resin was formed.

*Example 2*

A mixture of 25 g. of the above epoxide and
10 g. of phthalic anhydride was cured at 150° C. for 4 hours. A hard, clear, amber resin was formed.

*Example 3*

A mixture of 3 g. m-phenylene diamine and
25 g. of the above epoxide was cured at 40° to 55° C. for 20 hours. A hard, clear, amber resin resulted.

*Example 4*

A mixture of 1.4 g. of ethylene diamine and
25 g. of the above epoxide was cured at room temperature for 24 hours. A hard, clear, amber resin was formed.

A series of other examples are shown in the following table, together with other properties and characters.

Other resins prepared from the above epoxide:

Thus the process of the present invention produces a new type of resin containing a relatively high proportion of chlorine which renders the material flame resistant and combustion resistant to an outstandingly superior degree.

While there are above disclosed but a limited number of embodiments of the process of the invention it is possible to provide still other embodiments without departing from the inventive concept herein disclosed, and it is therefore desired that only such limitations be imposed upon the appended claims as are stated therein or required by the prior art.

The invention claimed is:

1. A synthetic resin obtained by condensing the product resulting from the reaction of 2,2,3,3-tetrachloro-1,4-butanediol with epichlorohydrin in the presence of an alkali hydroxide as catalyst and an alcohol as solvent at a temperature of from room temperature to 150° C., with from .6 to 1.2 molar proportions of a bifunctional co-condensate selected from the group consisting of a diamine, a polycarboxylic acid and a dicarboxylic acid anhydride.

2. A synthetic resin as defined in claim 1 wherein the bifunctional co-condensate specified is a diamino alkane having from 2 to 8 alkyl carbon atoms.

3. A synthetic resin as defined in claim 1 wherein the bifunctional co-condensate specified is a phenylenediamine.

4. A synthetic resin as defined in claim 1 wherein the bifunctional co-condensate specified is phthalic anhydride.

References Cited in the file of this patent

UNITED STATES PATENTS

| 2,512,996 | Bixler | June 27, 1950 |
| 2,538,072 | Zech | Jan. 16, 1951 |
| 2,581,464 | Zech | Jan. 8, 1952 |
| 2,602,785 | Wiles et al. | July 8, 1952 |
| 2,651,589 | Shokal et al. | Sept. 8, 1953 |